US012100099B2

(12) United States Patent
Liu et al.

(10) Patent No.: US 12,100,099 B2
(45) Date of Patent: Sep. 24, 2024

(54) METHOD, ELECTRONIC DEVICE, AND COMPUTER PROGRAM PRODUCT FOR GENERATING THREE-DIMENSIONAL SCENE

(71) Applicant: Dell Products L.P., Round Rock, TX (US)

(72) Inventors: Zhisong Liu, Shenzhen (CN); Zijia Wang, WeiFang (CN); Anzhou Hou, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 17/984,474

(22) Filed: Nov. 10, 2022

(65) Prior Publication Data

US 2024/0135638 A1 Apr. 25, 2024
US 2024/0233255 A9 Jul. 11, 2024

(30) Foreign Application Priority Data

Oct. 20, 2022 (CN) .......................... 202211288070.2

(51) Int. Cl.
*G06T 17/00* (2006.01)
*G06N 3/04* (2023.01)
(Continued)

(52) U.S. Cl.
CPC ................ *G06T 17/00* (2013.01); *G06T 7/10* (2017.01); *G06T 11/60* (2013.01)

(58) Field of Classification Search
CPC ..... G06T 7/10–13; G06T 7/174; G06T 9/002; G06T 9/20; G06T 11/60; G06T 17/00;
(Continued)

(56) References Cited

U.S. PATENT DOCUMENTS 8,861,881 B2 * 10/2014 Tate .......................... G06T 7/75
382/284
11,927,965 B2 * 3/2024 Ebrahimi Afrouzi ........................
G06F 3/04845
(Continued)

OTHER PUBLICATIONS

B. Mildenhall et al., "NeRF: Representing Scenes as Neural Radiance Fields for View Synthesis," European Conference on Computer Vision, Aug. 2020, 17 pages.
(Continued)

*Primary Examiner* — Wesner Sajous
(74) *Attorney, Agent, or Firm* — Ryan, Mason & Lewis, LLP (57) ABSTRACT

A method, an electronic device, and a computer program product for generating a three-dimensional scene are provided in embodiments of the present disclosure. The method may include obtaining source image features from a plurality of two-dimensional source images associated with the three-dimensional scene to be generated. The method may further include obtaining editing features from an editing instruction input by a user for the three-dimensional scene, each of the editing features respectively forming a feature pair with each of the source image features. Furthermore, the method may include updating the source image features by maximizing a correlation coefficient of each of the feature pairs, and generating the three-dimensional scene based at least on the updated source image features. Embodiments of the present disclosure can realize arbitrary editing of a three-dimensional scene, thus enhancing the experience of human-computer interaction.

20 Claims, 5 Drawing Sheets

(51) Int. Cl.
  *G06T 7/10*   (2017.01)
  *G06T 11/60*  (2006.01)
  *G06V 10/10*  (2022.01)
  *G06V 10/70*  (2022.01)
  *G06V 30/14*  (2022.01)

(58) Field of Classification Search
  CPC ..... G06T 19/00; G06T 19/20; G06T 2200/04; G06T 2200/08; G06N 3/042–045; G06N 3/0455; G06N 3/08; G06N 3/082; G06N 3/0895; G06N 3/09–098; G06N 3/0985; G06N 3/0464; G06V 10/70–76; G06V 30/14; G06V 30/16–18; G06V 10/10; G06V 10/20; G06V 10/22; G06V 10/235; G06V 10/757; G06V 10/771; G06V 10/7715; G06V 10/82
  See application file for complete search history.

(56) References Cited

U.S. PATENT DOCUMENTS

| | | | |
|---|---|---|---|
| 2022/0276632 A1* | 9/2022 | Shapiro | G05B 19/4097 |
| 2024/0144623 A1* | 5/2024 | Gori | G06T 19/20 |

OTHER PUBLICATIONS

T. Müller et al., "Instant Neural Graphics Primitives with a Multiresolution Hash Encoding," arXiv:2201.05989v2, May 4, 2022, 15 pages.

J. T. Barron et al., "Mip-NeRF 360: Unbounded Anti-Aliased Neural Radiance Fields," Conference on Computer Vision and Pattern Recognition, arXiv:2111.12077v3, Mar. 25, 2022, 18 pages.

G. Gafni et al., "Dynamic Neural Radiance Fields for Monocular 4D Facial Avatar Reconstruction," IEEE/CVF Conference on Computer Vision and Pattern Recognition, Jun. 2021, pp. 8649-8658.

S. Liu et al., "Editing Conditional Radiance Fields," International Conference on Computer Vision, arXiv:2105.06466v2, Jun. 4, 2021, 24 pages.

C. Wang et al., "CLIP-NeRF: Text-and-Image Driven Manipulation of Neural Radiance Fields," arXiv:2112.05139v3, Mar. 2, 2022, 13 pages.

A. Radford et al., "Learning Transferable Visual Models From Natural Language Supervision," International Conference on Machine Learning, arXiv:2103.00020v1, Feb. 26, 2021, 48 pages.

S. Zhi et al., "In-Place Scene Labelling and Understanding with Implicit Scene Representation," International Conference on Computer Vision, arXiv:2103.15875v2, Aug. 21, 2021, 14 pages.

S. Kobayashi et al., "Decomposing NeRF for Editing via Feature Field Distillation," arXiv:2205.15585v1, May 31, 2022, 23 pages.

B. Li et al., "Language-driven Semantic Segmentation," International Conference on Learning Representations, arXiv:2201.03546v2, Apr. 3, 2022, 13 pages.

M. Caron et al., "Emerging Properties in Self-Supervised Vision Transformers," IEEE/CVF Conference on Computer Vision and Pattern Recognition. Jun. 2021, pp. 9650-9660.

* cited by examiner

METHOD, ELECTRONIC DEVICE, AND COMPUTER PROGRAM PRODUCT FOR GENERATING THREE-DIMENSIONAL SCENE

RELATED APPLICATION

The present application claims priority to Chinese Patent Application No. 202211288070.2, filed Oct. 20, 2022, and entitled "Method, Electronic Device, and Computer Program Product for Generating Three-Dimensional Scene," which is incorporated by reference herein in its entirety.

FIELD

Embodiments of the present disclosure relate to the field of computer science, and more particularly, to a method, an electronic device, and a computer program product for generating a three-dimensional scene.

BACKGROUND

Deep learning technology has been widely used in various fields, including three-dimensional scene processing. Synthesis of new three-dimensional views using deep learning has begun to show great prospects, and the basic idea is to use a deep convolutional neural network to learn implicit representations. Current image generation models have been proven to be promising for synthesizing three-dimensional views based on two-dimensional images. However, these image generation models provide little or no interactive three-dimensional scene editing. For example, conventional image generation models cannot receive an editing instruction of a user to customize or modify a three-dimensional scene. To achieve three-dimensional scene editing based on editing instructions of users, more complex image generation models need to be trained, and expensive data annotations need to be prepared.

SUMMARY

Embodiments of the present disclosure provide a solution for generating a three-dimensional scene.

In a first aspect of the present disclosure, a method for generating a three-dimensional scene is provided. The method may include obtaining source image features from a plurality of two-dimensional source images associated with a three-dimensional scene to be generated. The method may further include obtaining editing features from an editing instruction input by a user for the three-dimensional scene, each of the editing features respectively forming a feature pair with each of the source image features. Furthermore, the method may include updating the source image features by maximizing a correlation coefficient of each of the feature pairs, and generating the three-dimensional scene based at least on the updated source image features.

In a second aspect of the present disclosure, an electronic device is provided, including a processor; and a memory coupled to the processor and having instructions stored therein, wherein the instructions, when executed by the processor, cause the electronic device to perform actions including: obtaining source image features from a plurality of two-dimensional source images associated with the three-dimensional scene to be generated; obtaining editing features from an editing instruction input by a user for the three-dimensional scene, each of the editing features respectively forming a feature pair with each of the source image features; updating the source image features by maximizing a correlation coefficient of each of the feature pairs; and generating the three-dimensional scene based at least on the updated source image features.

In a third aspect of the present disclosure, a computer program product is provided. The computer program product is tangibly stored on a non-transitory computer-readable medium and includes machine-executable instructions. The machine-executable instructions, when executed by a machine, cause the machine to perform any steps of the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

Example embodiments of the present disclosure are described in more detail with reference to the accompanying drawings, the above and other objectives, features, and advantages of the present disclosure will become more apparent, and identical or similar reference numbers generally represent identical or similar components in the example embodiments of the present disclosure.

In the accompanying drawings.

DETAILED DESCRIPTION

Principles of the present disclosure will be described below with reference to several example embodiments illustrated in the accompanying drawings.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "a set of embodiments." The term "another embodiment" indicates "a group of other embodiments." The terms "first," "second," and the like may refer to different or identical objects. Other explicit and implicit definitions may also be included below.

As discussed above, the application of deep learning technology in three-dimensional scenes is progressing. Synthesis of new three-dimensional views using the deep learning technology based on user-customized requirements has begun to show very promising results. The conventional deep learning technology is to use a deep convolutional neural network to learn implicit representations. Neural radiation fields (NeRF) have recently attracted much attention from researchers because of their simplicity and efficiency. They use a differentiable volume rendering technology to sample an implicit three-dimensional space for realistic scene reconstruction. However, the NeRF technology still has many problems. For example, the training process of NeRF models is rigorously supervised using paired data. In other words, a large amount of labeled training data is required for training the NeRF models, and the trained models may not adapt well to different application environments. Therefore, conventional three-dimensional scene models have challenges in both cost and efficiency.

In order to solve, at least in part, the above problem, an embodiment of the present disclosure provides a novel solution for generating a three-dimensional scene. First, a user may input two or more two-dimensional source images about one or more objects shot or drawn from different angles. A computing device may extract source image features from these two-dimensional source images. Furthermore, the user may also input an editing instruction for a three-dimensional scene to be generated, e.g., changing the background of the three-dimensional scene, deleting or adding an object in the three-dimensional scene, etc. The computing device may extract editing features from the editing instruction, and each of the editing features and each of the source image features form a feature pair. Further, the computing device updates the source image features by maximizing a correlation coefficient of each feature pair to find parameters in the source image features that associate the source image features with the editing features. Based on the updated source image features containing the parameters, the computing device may generate a three-dimensional scene corresponding to the editing instruction of the user. Through the above operations, arbitrary editing of a three-dimensional scene can be realized, thus enhancing the experience of human-computer interaction. Furthermore, the above operations do not rely on a model training process with a large number of expensive labeled samples, thus significantly saving costs.

Figure 1:
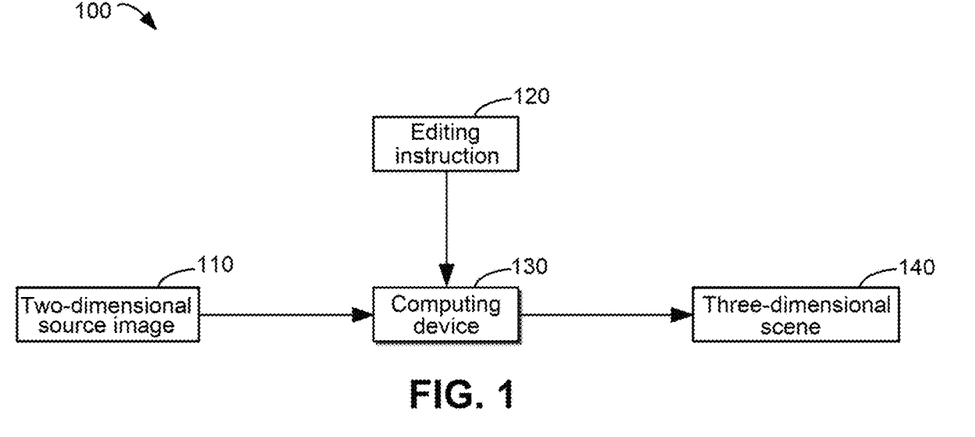
FIG. 1 shows a schematic diagram of an example environment according to an embodiment of the present disclosure.

FIG. 1 shows a schematic diagram of example environment 100 according to an embodiment of the present disclosure. In example environment 100, a device and/or a process according to an embodiment of the present disclosure may be implemented. As shown in FIG. 1, example environment 100 may include two-dimensional source image 110, editing instruction 120 from a user, computing device 130, and three-dimensional scene 140 associated with two-dimensional source image 110.

In FIG. 1, computing device 130 receives two-dimensional source image 110 and editing instruction 120 input by the user, respectively. Two-dimensional source image 110 may be a multi-angle image shot for one or more objects or a multi-angle sketch for one or more objects. As an example, one of two-dimensional source images 110 may be characterized by shooting angle T(d) and three-dimensional coordinates T(x). Furthermore, editing instruction 120 may be editing text input by the user, such as "background is blue sky, white cloud, and green space" and "delete a protrusion at the front of a bucket." Editing instruction 120 may also be a sketch input by the user that may reflect an editing intention.

Computing device 130 extracts the features of two-dimensional source image 110 and editing instruction 120, and adjusts the features of two-dimensional source image 110 based on the two sets of features. Then, computing device 130 may generate three-dimensional scene 140 based on the adjusted features of two-dimensional source image 110. Three-dimensional scene 140 may be a particular scene in a three-dimensional space that computing device 130 or other computing devices may access. The user may view a stereoscopic view of three-dimensional scene 140 from any angle through the computing device. Due to the influence of the features of two-dimensional source image 110 and the features of editing instruction 120 received, three-dimensional scene 140 generated may implement the editing intention of editing instruction 120 input by the user.

In some embodiments, the computing device herein may be any device with computing power. As a non-limiting example, the computing device may be any type of fixed computing device, mobile computing device, or portable computing device, including but not limited to a desktop computer, a laptop computer, a notebook computer, a netbook computer, a tablet computer, a smart phone, and the like. All or part of the components of the computing device may be distributed in a cloud. The computing device may also adopt a cloud-edge architecture. It should be understood that computing device 130 may be configured with a storage system for storing related data, such as a hard disk drive (HDD), a solid state drive (SSD), a removable disk, any other magnetic storage device, and any other optical storage device, or any combination thereof.

It should be understood that FIG. 1 is intended only to illustrate some concepts of the present disclosure and is not intended to limit the scope of the present disclosure.

A process for generating a three-dimensional scene according to an embodiment of the present disclosure will be described in detail below with reference to FIG. 2. For ease of understanding, specific data mentioned in the following description is illustrative and is not intended to limit the protection scope of the present disclosure. It should be understood that embodiments described below may also include additional actions not shown and/or may omit actions shown, and the scope of the present disclosure is not limited in this regard.

Figure 2:
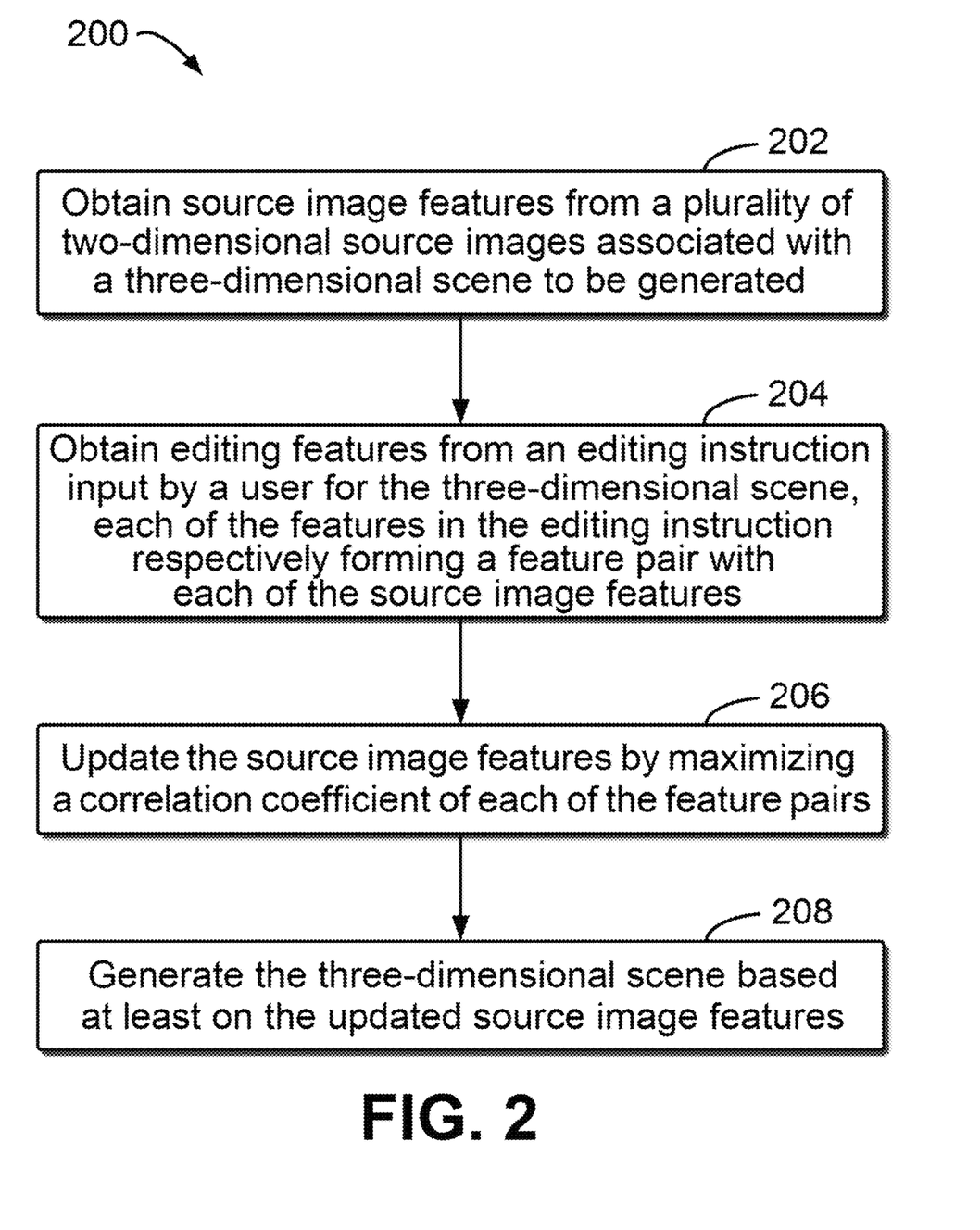
FIG. 2 shows a flow chart of a process for generating a three-dimensional scene according to an embodiment of the present disclosure.

FIG. 2 shows a flow chart of process 200 for generating a three-dimensional scene according to an embodiment of the present disclosure. Process 200 for generating a three-dimensional scene according to an embodiment of the present disclosure is described now with reference to FIG. 2. For ease of understanding, specific examples mentioned in the following description are illustrative and are not intended to limit the protection scope of the present disclosure.

As shown in FIG. 2, at 202, computing device 130 may obtain source image features from a plurality of two-dimensional source images 110. These two-dimensional source images 110 are associated with three-dimensional scene 140 to be generated. It should be understood that a NeRF neural network may be constructed in computing device 130. Two-dimensional source image 110 may be characterized by shooting angle T(d) and three-dimensional coordinates T(x).

At 204, computing device 130 may obtain editing features from editing instruction 120 input by a user for three-dimensional scene 140. It should be understood that the obtained editing features may be processed such that each feature therein separately forms a feature pair with each feature of the source image features. As an example, N editing features may be combined in pairs with N source image features. N is an integer greater than 1.

At 206, computing device 130 may update the source image features by maximizing a correlation coefficient of each of the feature pairs. In other words, computing device 130 may find parameters in the source image features that associate the source image features with the editing features.

Then, at 208, computing device 130 may generate three-dimensional scene 140 based at least on the updated source image features. In this way, the features of two-dimensional source image 110 may be adjusted based on the features of editing instruction 120, so that three-dimensional scene 140 generated may conform to editing instruction 120 input by the user. As an example, if editing instruction 120 input by the user is "background is blue sky, white cloud, and green space," computing device 130 may reconstruct one or more objects in two-dimensional source image 110 in three dimensions based on the adjusted features of two-dimensional source image 110, and the background of three-dimensional scene 140 will have blue sky, white cloud, and green space.

Figure 3A:
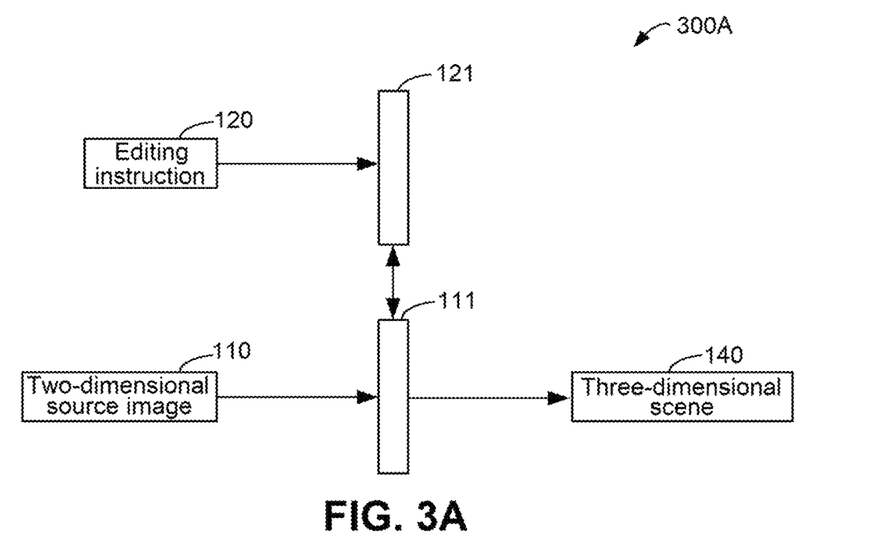
FIG. 3A shows a schematic diagram of a computing module for generating a three-dimensional scene according to an embodiment of the present disclosure.
Figure 3B:
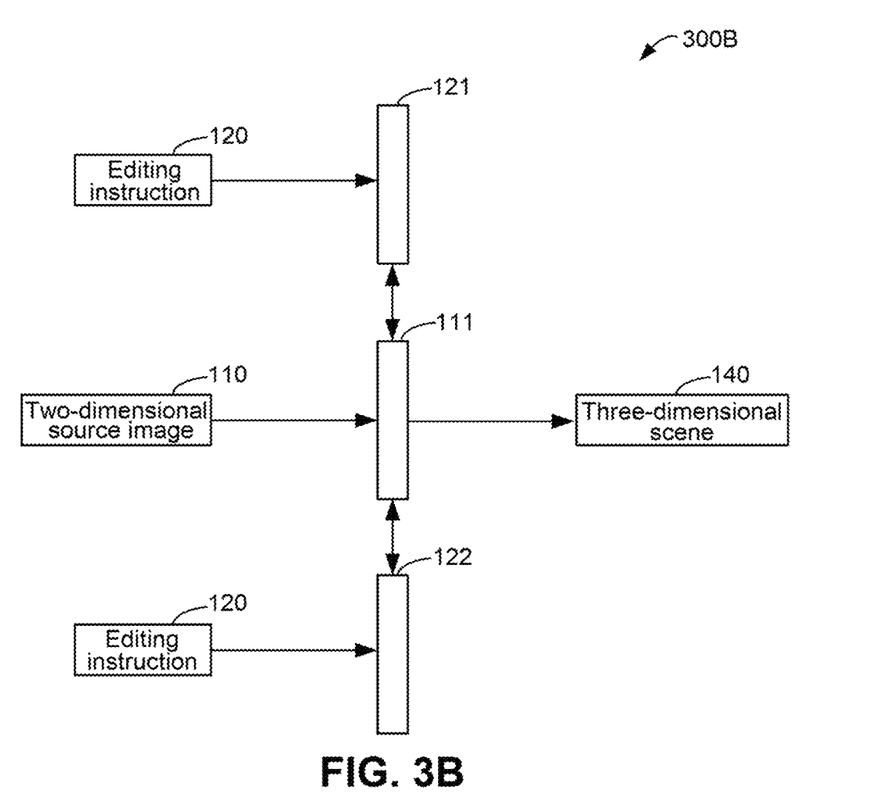
FIG. 3B shows a schematic diagram of a computing module for generating a three-dimensional scene according to another embodiment of the present disclosure.

In order to describe the technical solution of the present disclosure in more detail, FIGS. 3A and 3B show schematic diagrams of a computing module for generating a three-dimensional scene according to two embodiments of the present disclosure. Computing module 300A for generating a three-dimensional scene according to an embodiment of the present disclosure is described now with reference to FIG. 3A. For ease of understanding, specific examples mentioned in the following description are illustrative and are not intended to limit the protection scope of the present disclosure.

As shown in FIG. 3A, computing device 130 may obtain source image features 111 from two-dimensional source image 110. It should be understood that when a NeRF neural network is created in computing device 130, computing device 130 may typically reconstruct a three-dimensional scene directly for two-dimensional source image 110. Since the three-dimensional scene and edited three-dimensional scene 140 typically contain only a small number of modifications, two-dimensional source image 110 is associated with edited three-dimensional scene 140 to be generated. Accordingly or in parallel, computing device 130 may also obtain editing features 121 from an editing instruction input by a user for three-dimensional scene 140, so that each of editing features 121 respectively forms a feature pair with each of source image features 111. Then, computing device 130 updates source image features 111 by maximizing a correlation coefficient of each of the feature pairs, whereby computing device 130 may generate three-dimensional scene 140 based on updated source image features 111.

It should be understood that when an editing image is contained in the editing instruction of the user, source image features 111 may be further updated with the editing image so as to make three-dimensional scene 140 more accurately conform to editing instruction 120 of the user. This process is described in detail in the following embodiments.

Computing module 300B for generating a three-dimensional scene according to another embodiment of the present disclosure is described below with reference to FIG. 3B. For ease of understanding, specific examples mentioned in the following description are illustrative and are not intended to limit the protection scope of the present disclosure.

It should be understood that FIG. 3B is similar to FIG. 3A, except that computing device 130 also determines a segmentation image for three-dimensional scene 140 based on the editing image that serves as editing instruction 120, and extracts segmentation features 122 from the segmentation image. It should be understood that the segmentation image at least indicates boundaries of one or more objects in the editing image. As an example, a conventional boundary detection model may be used to obtain the segmentation image. Then, computing device 130 may update source image features 111 by minimizing the distances between segmentation features 122 and source image features 111. Segmentation features 122 may weakly supervise source image features 111 at a layout level of an image. In this way, source image features 111 may be adjusted based on editing features 121 and segmentation features 122 so that the editing of the editing instruction in the three-dimensional scene may be more accurately expressed.

Figure 4:
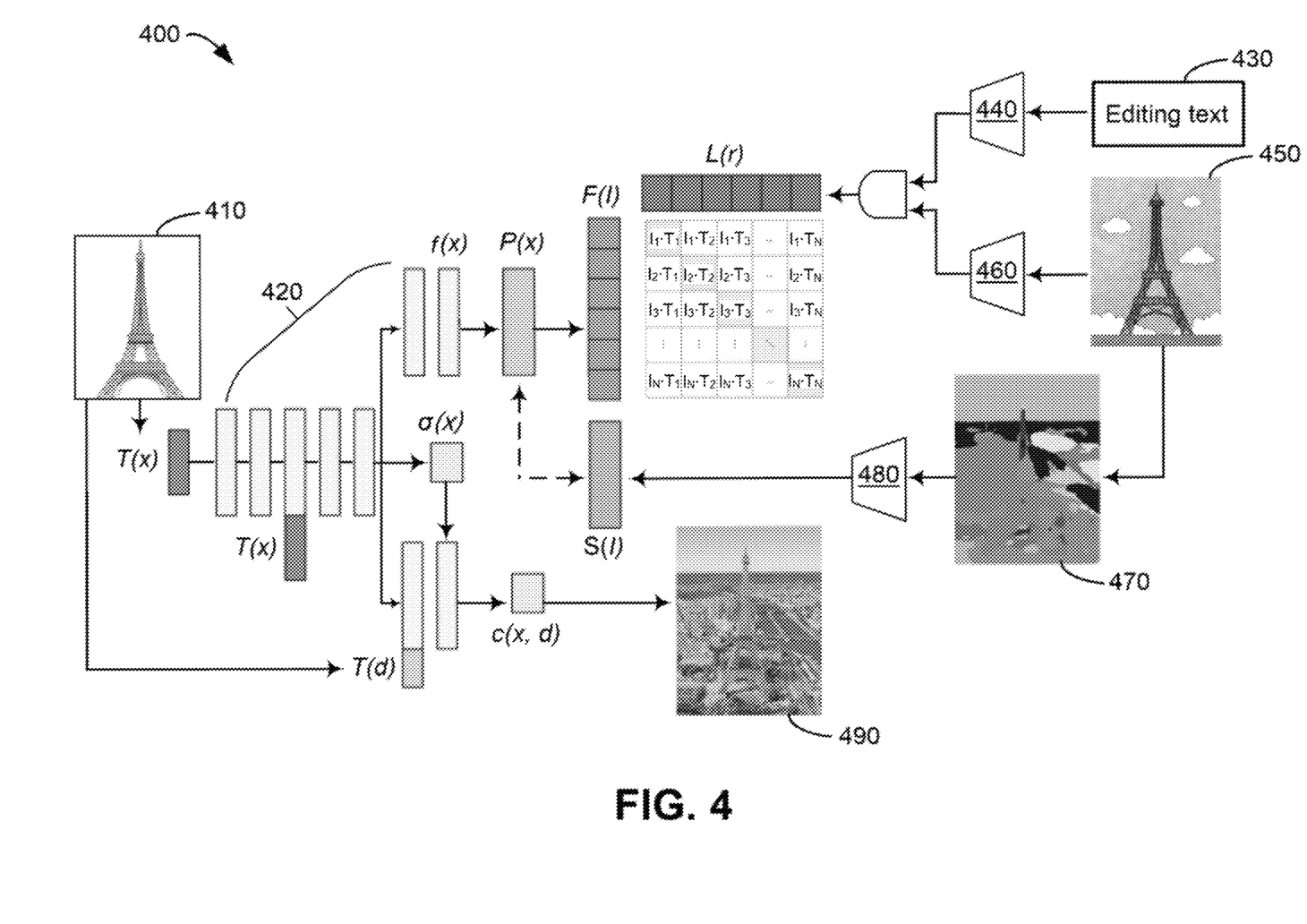
FIG. 4 shows a schematic diagram of a computing system for generating a three-dimensional scene according to still another embodiment of the present disclosure.

To describe the entire three-dimensional scene generation system in more detail, a more detailed solution for generating a three-dimensional scene will be further described below in conjunction with FIG. 4. FIG. 4 shows a schematic diagram of computing system 400 for generating a three-dimensional scene according to still another embodiment of the present disclosure.

As shown in FIG. 4, to obtain source image features F(l), auxiliary feature vectors f(x) may first be extracted from a plurality of two-dimensional source images 410 (e.g., three-dimensional coordinates T(x) contained in two-dimensional source images 410) through a plurality of fully connected layers 420. At least the auxiliary feature vectors f(x) may be extended to new feature vectors (extended feature vectors) P(x). Then, normalized source vectors may be obtained from the feature vectors P(x) using an embedded layer as the source image features F(l).

Simultaneously or in parallel, image feature vectors may be extracted from editing image 450 by image encoder 460 so as to obtain editing features L(r) of the editing instruction containing editing image 450. Alternatively, text feature vectors and image feature vectors may be extracted from editing text 430 and editing image 450 by text encoder 440 and image encoder 460, respectively, so as to obtain editing features L(r) of the editing instruction containing editing text 430 and editing image 450. Then, normalized editing vectors (which may be 512-dimensional vectors) may be obtained from the image feature vectors or from the text feature vectors and the image feature vectors using the above embedded layer as the editing features L(r).

As an example, N editing features may be combined in pairs with N source image features, where N is an integer greater than 1. After determining the source image features F(l) and the editing features L(r), as shown in FIG. 4, computing system 400 may learn co-linearity or correlation by maximizing the cosine similarity of N correct feature pairs (values on diagonals in a feature matrix) while minimizing the cosine similarity of $N^2-N$ incorrect feature pairs. The co-linearity or correlation may be expressed as follows:

$$\text{Corr} = \sum_{i}^{2N} \frac{F_i(l) \cdot L_i(r)^T}{e^t} \qquad (1)$$

where $e^t$ represents a normalization operation, $F_i(l)$ represents the $i^{th}$ source image feature, and $L_i(r)$ represents the $i^{th}$ editing feature.

For example, a feature matrix having a value of 1 on the diagonal and 0 at other positions may be trained as a true value, so as to determine parameters associated with the source image features F(l). At this moment, the source image features F(l) adjusted by training already contain information of the editing instruction input by the user.

Furthermore, computing system 400 also uses a pre-trained boundary recognition model or pixel-level image segmentation model to determine segmentation image 470 based on editing image 450, and uses encoder 480 to extract segmentation features S(l) from segmentation image 470. It should be understood that segmentation image 470 at least indicates boundaries of one or more objects in editing image 450. Then, the source image features F(l) may be updated by minimizing the distances between the segmentation features S(l) and the source image features F(l). It should be understood that the distance may be understood as a feature loss determined by supervision, and the feature loss may be expressed as follows:

$$L_f = \frac{1}{2N}\sum_i^{2N}\|S_i(l) - F_i(l)\|_1 \qquad (2)$$

where $S_i(l)$ represents the $i^{th}$ segmentation feature.

Furthermore, as shown in FIG. 4, computing system 400 that is constructed with a NeRF neural network may determine a probability of occurrence of at least one object at the three-dimensional coordinates T(x), i.e., a rendering density σ(x), based on the updated source image features F(l) and the three-dimensional coordinates T(x). Then, a color channel (RGB) value c(x, d) may be determined based on the updated source image features F(l), the rendering density σ(x), and the shooting angle T(d), thereby generating three-dimensional scene 490 based on the RGB value c(x, d).

Figure 5:
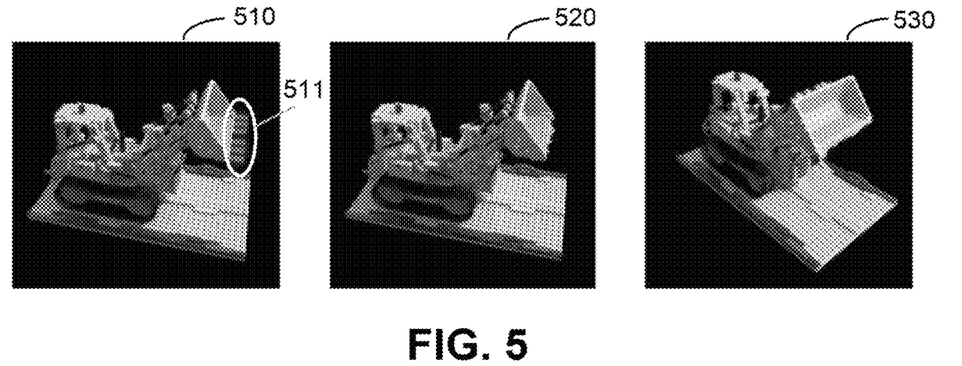
FIG. 5 shows an effect diagram of modifying a three-dimensional scene based on an editing instruction according to an embodiment of the present disclosure.

FIG. 5 shows an effect diagram of modifying a three-dimensional scene based on an editing instruction according to an embodiment of the present disclosure. In FIG. 5, the front of a bucket of a digger in effect diagram 510 includes protrusion 511. Since the effect diagram is in a three-dimensional scene, it is difficult for a user to directly modify objects in the effect diagram. By utilizing the solution for generating a three-dimensional scene in the present disclosure, the user may edit the digger in the three-dimensional scene by inputting an editing instruction such as "delete the protrusion at the front of the bucket" and/or a sketch in which the protrusion at the front of the bucket is deleted. The edited digger does not contain the protrusion as shown in effect diagrams 520 and 530, and the user may view the digger in the three-dimensional scene from different angles.

It should be understood that the editing instruction input by the user may be used for instructing the computing device 130 to perform operations such as object addition, object deletion, and object background editing.

Through the above embodiments, source image features used for generating a three-dimensional scene may be optimized at a feature space level using an editing instruction input by a user, so that the generated three-dimensional scene conforms to an editing intention of the user, and then arbitrarily marking of the three-dimensional scene is realized, thereby making it possible for human-computer interaction in the three-dimensional scene. Furthermore, since the solution of the present disclosure does not require expensive labeled samples for training, a great amount of labor costs are saved.

Figure 6:
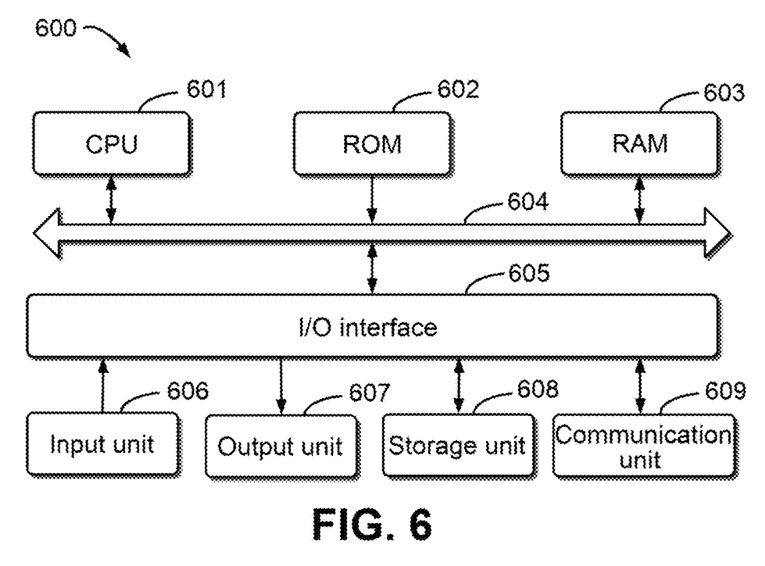
FIG. 6 shows a block diagram of an example device that may be used to implement an embodiment of the present disclosure.

FIG. 6 shows a block diagram of example device 600 that may be used to implement an embodiment of the present disclosure. For example, device 600 may be used to implement computing device 130 shown in FIG. 1. As shown in the figure, device 600 includes a central processing unit (CPU) 601 that may perform various appropriate actions and processing according to computer program instructions stored in read-only memory (ROM) 602 or computer program instructions loaded from storage unit 608 into random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

CPU 601 performs the various methods and processing described above, such as process 200. For example, in some embodiments, the various methods and processing described above may be implemented as a computer software program or a computer program product, which is tangibly included in a machine-readable medium, such as storage unit 608. In some embodiments, part of or all the computer program may be loaded and/or installed onto device 600 via ROM 602 and/or communication unit 609. When the computer program is loaded into RAM 603 and executed by CPU 601, one or a plurality of steps of any process described above may be implemented. Alternatively, in other embodiments, CPU 601 may be configured in any other suitable manners (for example, by means of firmware) to perform a process such as process 200.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination described above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations will be apparent to persons of ordinary skill in the art without departing from the scope and spirit of the illustrated embodiments. The selection of terms used herein is intended to best explain the principles and practical applications of the embodiments and their associated improvements, so as to enable persons of ordinary skill in the art to understand the embodiments disclosed herein.

What is claimed is:

1. A method for generating a three dimensional scene, comprising:
    obtaining source image features from a plurality of two-dimensional source images associated with a three-dimensional scene to be generated;
    obtaining editing features from an editing instruction input by a user for the three-dimensional scene, each of the editing features respectively forming a feature pair with each of the source image features;
    updating the source image features based on a correlation coefficient of each of the feature pairs; and
    generating the three-dimensional scene based on the updated source image features;
    wherein updating the source image features further comprises obtaining segmentation features from the editing instruction, and updating the source image features based on distances between the segmentation features and the source image features.

2. The method according to claim 1, wherein the editing instruction comprises at least an editing image, and the method further comprises:

determining a segmentation image for the three-dimensional scene based on the editing image, the segmentation image indicating at least boundaries of one or more objects in the editing image;
obtaining the segmentation features from the segmentation image; and
updating the source image features by minimizing the distances between the segmentation features and the source image features.

3. The method according to claim 1, wherein obtaining the source image features comprises:
extracting auxiliary feature vectors from the plurality of two-dimensional source images through a plurality of fully connected layers;
determining extended feature vectors based on the auxiliary feature vectors; and
obtaining normalized source vectors from the extended feature vectors using an embedded layer as the source image features.

4. The method according to claim 3, wherein the editing instruction comprises an editing image, and obtaining the editing features comprises:
extracting image feature vectors from the editing image by an image encoder; and
obtaining normalized editing vectors from the image feature vectors using the embedded layer as the editing features.

5. The method according to claim 3, wherein the editing instruction comprises editing text and an editing image, and obtaining the editing features comprises:
respectively extracting text feature vectors and image feature vectors from the editing text and the editing image by a text encoder and an image encoder; and
obtaining normalized editing vectors from the text feature vectors and the image feature vectors using the embedded layer as the editing features.

6. The method according to claim 1, wherein the plurality of two-dimensional source images indicate a shooting angle associated with the three-dimensional scene and three-dimensional coordinates of at least one object in the three-dimensional scene.

7. A method, comprising:
obtaining source image features from a plurality of two-dimensional source images associated with a three-dimensional scene to be generated;
obtaining editing features from an editing instruction input by a user for the three-dimensional scene, each of the editing features respectively forming a feature pair with each of the source image features;
updating the source image features based on a correlation coefficient of each of the feature pairs; and
generating the three-dimensional scene based on the updated source image features;
wherein the plurality of two-dimensional source images indicate a shooting angle associated with the three-dimensional scene and three-dimensional coordinates of at least one object in the three-dimensional scene; and
wherein generating the three-dimensional scene comprises:
determining a probability of occurrence of the at least one object at the three-dimensional coordinates based on the updated source image features and the three-dimensional coordinates;
determining a color channel value based on the updated source image features, the probability, and the shooting angle; and
generating the three-dimensional scene based on the color channel value.

8. The method according to claim 1, wherein the editing instruction is used for instructing to perform at least one of the following editing operations:
object addition;
object deletion; and
object background editing.

9. An electronic device, comprising:
at least one processor; and
a memory coupled to the at least one processor and having instructions stored therein, wherein the instructions, when executed by the at least one processor, cause the electronic device to perform actions comprising:
obtaining source image features from a plurality of two-dimensional source images associated with a three-dimensional scene to be generated;
obtaining editing features from an editing instruction input by a user for the three-dimensional scene, each of the editing features respectively forming a feature pair with each of the source image features;
updating the source image features based on a correlation coefficient of each of the feature pairs; and
generating the three-dimensional scene based on the updated source image features;
wherein updating the source image features further comprises obtaining segmentation features from the editing instruction, and updating the source image features based on distances between the segmentation features and the source image features.

10. The electronic device according to claim 9, wherein the editing instruction comprises at least an editing image, and the actions further comprise:
determining a segmentation image for the three-dimensional scene based on the editing image, the segmentation image indicating at least boundaries of one or more objects in the editing image;
obtaining the segmentation features from the segmentation image; and
updating the source image features by minimizing the distances between the segmentation features and the source image features.

11. The electronic device according to claim 9, wherein obtaining the source image features comprises:
extracting auxiliary feature vectors from the plurality of two-dimensional source images through a plurality of fully connected layers;
determining extended feature vectors based on the auxiliary feature vectors; and
obtaining normalized source vectors from the extended feature vectors using an embedded layer as the source image features.

12. The electronic device according to claim 11, wherein the editing instruction comprises an editing image, and obtaining the editing features comprises:
extracting image feature vectors from the editing image by an image encoder; and
obtaining normalized editing vectors from the image feature vectors using the embedded layer as the editing features.

13. The electronic device according to claim 11, wherein the editing instruction comprises editing text and an editing image, and obtaining the editing features comprises:
respectively extracting text feature vectors and image feature vectors from the editing text and the editing image by a text encoder and an image encoder; and obtaining normalized editing vectors from the text feature vectors and the image feature vectors using the embedded layer as the editing features.

14. The electronic device according to claim 9, wherein the plurality of two-dimensional source images indicate a shooting angle associated with the three-dimensional scene and three-dimensional coordinates of at least one object in the three-dimensional scene.

15. The electronic device according to claim 14, wherein generating the three-dimensional scene comprises:
   determining a probability of occurrence of the at least one object at the three-dimensional coordinates based on the updated source image features and the three-dimensional coordinates;
   determining a color channel value based on the updated source image features, the probability, and the shooting angle; and
   generating the three-dimensional scene based on the color channel value.

16. The electronic device according to claim 9, wherein the editing instruction is used for instructing to perform at least one of the following editing operations:
   object addition;
   object deletion; and
   object background editing.

17. A computer program product tangibly stored on a non-transitory computer-readable medium and comprising machine-executable instructions, wherein the machine-executable instructions, when executed by a machine, cause the machine to perform actions comprising:
   obtaining source image features from a plurality of two-dimensional source images associated with a three-dimensional scene to be generated;
   obtaining editing features from an editing instruction input by a user for the three-dimensional scene, each of the editing features respectively forming a feature pair with each of the source image features;
   updating the source image features based on a correlation coefficient of each of the feature pairs; and
   generating the three-dimensional scene based on the updated source image features;
   wherein updating the source image features further comprises obtaining segmentation features from the editing instruction, and updating the source image features based on distances between the segmentation features and the source image features.

18. The computer program product according to claim 17, wherein the editing instruction comprises at least an editing image, and the actions further comprise:
   determining a segmentation image for the three-dimensional scene based on the editing image, the segmentation image indicating at least boundaries of one or more objects in the editing image;
   obtaining the segmentation features from the segmentation image; and
   updating the source image features by minimizing the distances between the segmentation features and the source image features.

19. The computer program product according to claim 17, wherein obtaining the source image features comprises:
   extracting auxiliary feature vectors from the plurality of two-dimensional source images through a plurality of fully connected layers;
   determining extended feature vectors based on the auxiliary feature vectors; and
   obtaining normalized source vectors from the extended feature vectors using an embedded layer as the source image features.

20. The computer program product according to claim 19, wherein the editing instruction comprises editing text and an editing image, and obtaining the editing features comprises:
   respectively extracting text feature vectors and image feature vectors from the editing text and the editing image by a text encoder and an image encoder; and
   obtaining normalized editing vectors from the text feature vectors and the image feature vectors using the embedded layer as the editing features.

\* \* \* \* \*